Figure 1:
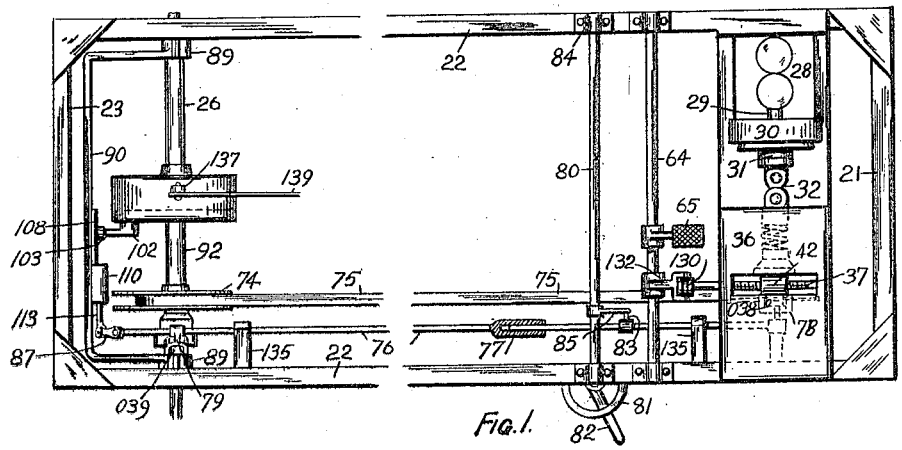

W. B. DUNBAR.
VARIABLE SPEED TRANSMISSION FOR MOTOR VEHICLES.
APPLICATION FILED MAY 9, 1917.

1,305,077.

Patented May 27, 1919.
7 SHEETS—SHEET 1.

Inventor
William Buyers Dunbar
per
Rosenbaum, Stockbridge & Borst Attorneys

W. B. DUNBAR.
VARIABLE SPEED TRANSMISSION FOR MOTOR VEHICLES.
APPLICATION FILED MAY 9, 1917.

1,305,077.

Patented May 27, 1919.
7 SHEETS—SHEET 2.

Inventor
William Buyers Dunbar
per
Rosenbaum, Stockbridge & Borst Attorneys

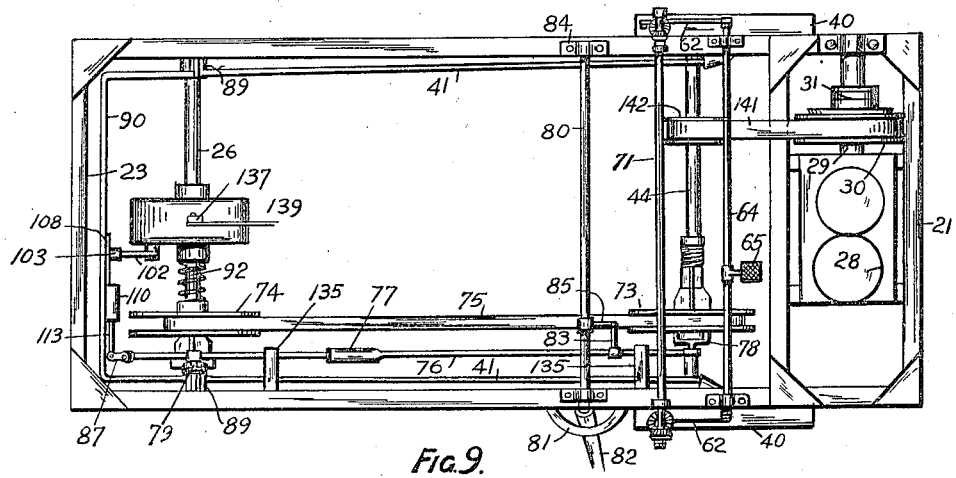

W. B. DUNBAR.
VARIABLE SPEED TRANSMISSION FOR MOTOR VEHICLES.
APPLICATION FILED MAY 9, 1917.

1,305,077.
Patented May 27, 1919.
7 SHEETS—SHEET 4.

Inventor
William Buyers Dunbar
per
Rosenbaum, Stockbridge & Borst Attorneys

W. B. DUNBAR.
VARIABLE SPEED TRANSMISSION FOR MOTOR VEHICLES.
APPLICATION FILED MAY 9, 1917.

1,305,077.

Patented May 27, 1919.
7 SHEETS—SHEET 5.

Inventor
William Buyers Dunbar
per
Rosenbaum, Stockman & Borst Attorneys

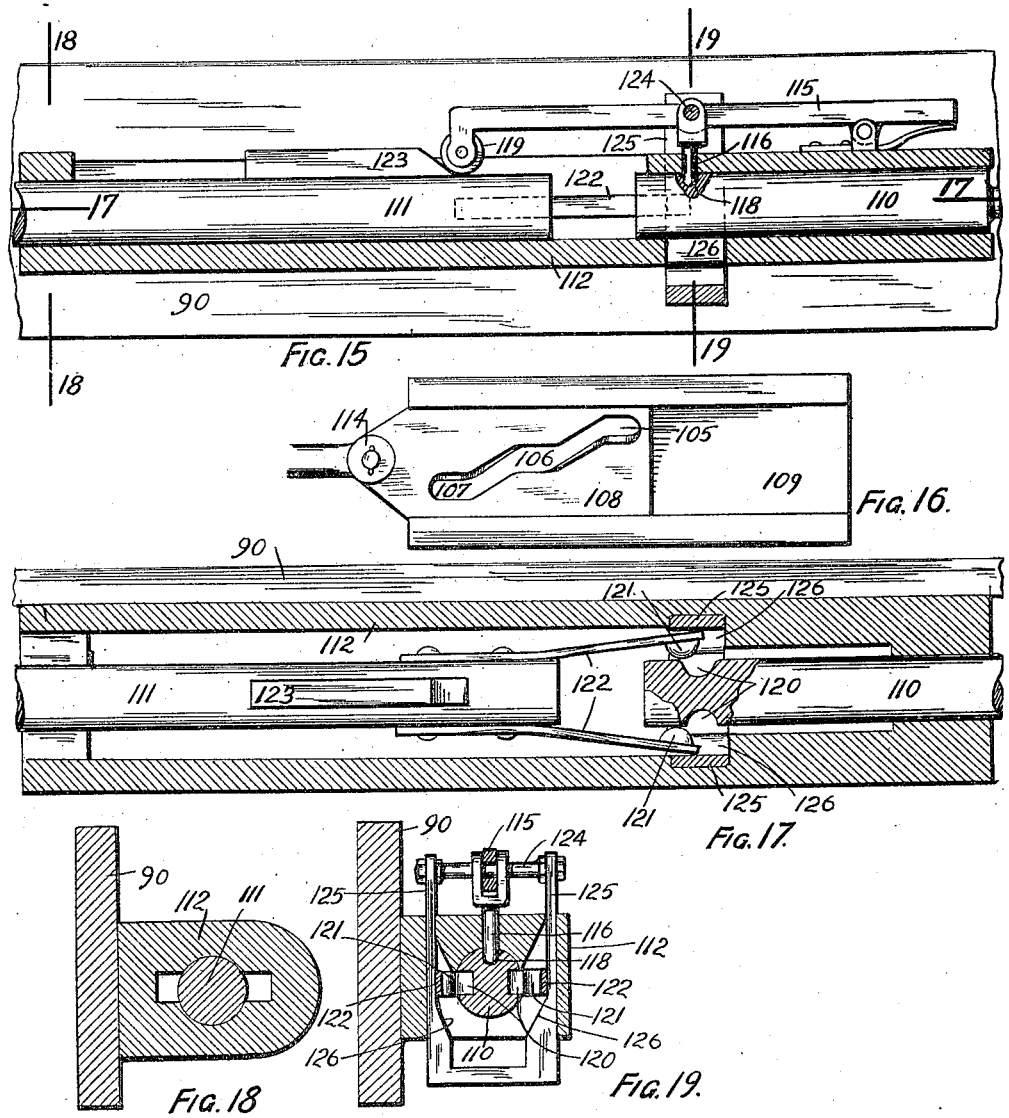

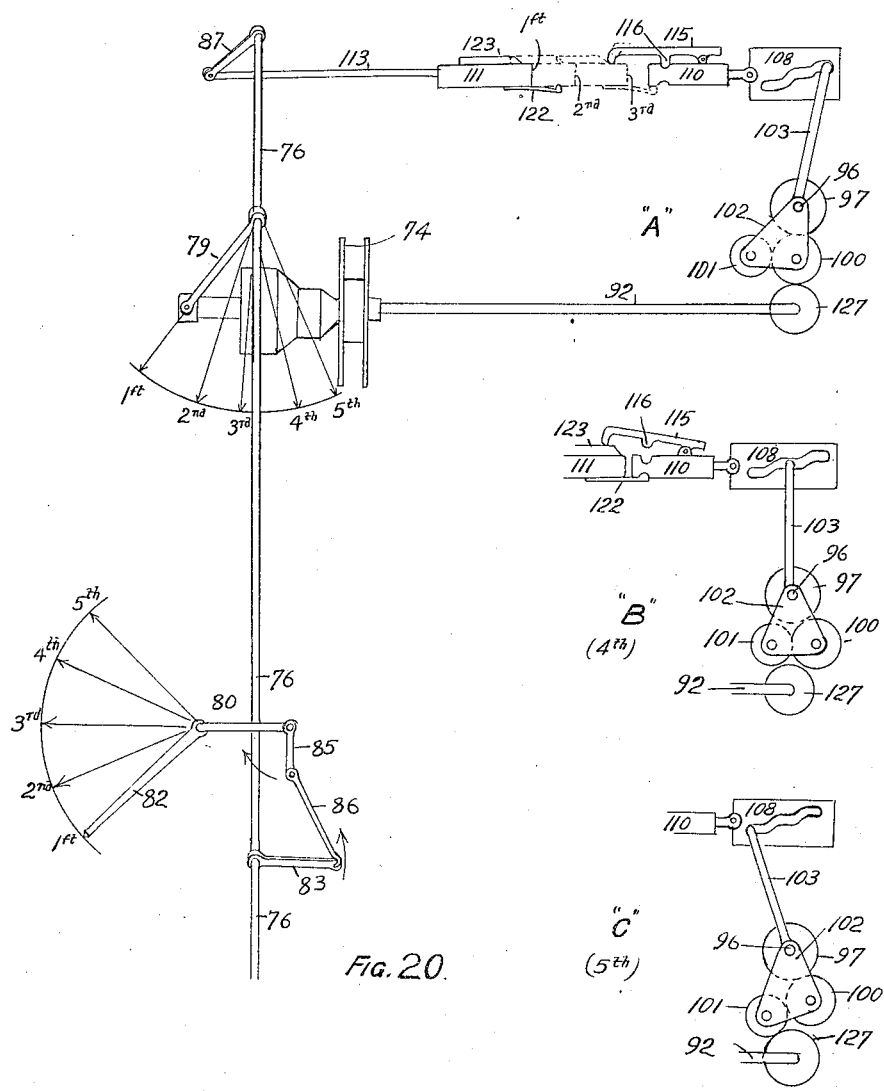

UNITED STATES PATENT OFFICE.

WILLIAM BUYERS DUNBAR, OF ASHFIELD, NEAR SYDNEY, NEW SOUTH WALES, AUSTRALIA, ASSIGNOR TO DUNBAR MOTORS AND PULLEYS LIMITED, OF SYDNEY, NEW SOUTH WALES, AUSTRALIA.

VARIABLE-SPEED TRANSMISSION FOR MOTOR-VEHICLES.

1,305,077. Specification of Letters Patent. Patented May 27, 1919.

Application filed May 9, 1917. Serial No. 167,406.

*To all whom it may concern:*

Be it known that I, WILLIAM BUYERS DUNBAR, a subject of the King of Great Britain, residing at No. 110 Victoria street, Ashfield, near Sydney, in the State of New South Wales and Commonwealth of Australia, have invented new and useful Improvements in and Relating to Variable-Speed Transmissions for Motor-Vehicles, of which the following is a specification.

This invention refers to the transmission of power from the engine of the ordinary form of internal combustion motor vehicle or like automobile at variable speeds without a change gear box or intricate mechanism of toothed gears and it has been specially devised to provide efficient variable speed transmission mechanism of cheap and simple construction.

A variable speed transmission for motor vehicles constructed according to these improvements has an endless belt running on a pair of variable speed pulleys adapted to be expanded and contracted relatively oppositely to each other. The forward or driver pulley is upon a shaft arranged transversely of the chassis which shaft is adapted to be rotated when the engine shaft is at right angles by means of gearing through a counter shaft. If the pulley shaft is set parallel to the engine shaft direct gears or a belt may be used to connect them rotatively. The rear or driven pulley is upon a shaft in bearings in or on a convenient sub-framing behind the rear axle. Of the pair of pulleys each is constructed of a plurality of segments (having radial stems) arranged in circularly set groups between a pair of pulley flanges and adapted to be operated by slidable slotted flitches or radial leaves so that a complete working face is presented at each of a plurality of diameters and these are preferably of the construction set forth in the specification of my United States of America Patent No. 1173787 dated 29th February 1916.

The pulleys are adapted to be adjusted (for change of speed) relative to their respective complementary sizes synchronously by forks upon the ends of a rotatable spindle connected to a hand lever having a suitable locking quadrant and this spindle has a squared telescopic portion.

For light cars or vehicles the engine shaft would be connected either directly or by means of an intermediate shaft with the driver pulley shaft in bearings on a longitudinally slidable sub-frame operatable by a pedal crank shaft having a radius arm connected to an adjustable screw stem in a nut on said frame.

For heavy vehicles the shaft of the forward or driver pulley has bearings in blocks adapted to have part-circular sliding motion in sector guides and in such case the engine shaft conveys motion to the pulley shaft by chains or belts either the engine shaft or the pulley shaft having suitable clutch or clutches operated by a convenient lever. And for some heavy vehicles it might be preferred to have two sets of variable speed pulleys and a belt for each set on either end of the engine.

For heavy vehicles also the shaft of the forward or driver pulley has at each end a bearing in a block adapted to have a part-circular sliding motion in a slidable carrier also part-circularly reciprocable around the same center and held in the lower and forward end of a sector guide in a fixed bracket preferably complementarily shaped, the center of motion being coaxial with the power or counter shaft transmitting motion to said pulley shaft. Between the top and rear end of the slidable bearing block and its slidable carrier is a strong expanding spring adapted to thrust the bearing block forwardly against the force of another expanding spring between the other end of said bearing block and the other end of said slidable carrier. Within the sector guide is a hollow slidable block or box abutting against the part circularly sliding carrier and connected to a toggle and a slidable radially set pull rod jointed to the toggle extends outwardly through guides to a sector shaped shoe adapted to be operated by one end of a lever or pedal to pull said toggle rod and to tighten the belt momentarily as desired. The slidable toggle block is also jointed to one end of a screw rod through a nut on the bracket with a gear wheel upon its end in mesh with another gear wheel on a part-rotatable rod having a hand wheel the manipulation of which operates the screw rod to alter the position of the slidable block and carrier in the sector guide and so adjust the tension of the belt.

The rear or driven pulley shaft is carried in bearings in or upon a rearwardly extending sub-framing hinged or part-revoluble on the casing of the rear axle and supported by means of two or more torsion or radius rods or hounds at each side which pass forwardly and extend thereto from the bearings of the counter shaft between the engine shaft and the driven pulley shaft. The driven pulley shaft surrounds the rear axle and carries a toothed wheel adapted to mesh with one or the other of two toothed wheels both being axially held in bearings on a pivoted bracket and one or the other of which is adapted to mesh with a fourth toothed wheel and which fourth toothed wheel acts as the crown pinion in an internally toothed rim or wheel of the differential gear which otherwise is of ordinary construction. An arm or tail of this bracket passes into a slot in a slidable plate supported in guides upon the rear member of the sub-framing and this slot is so shaped that normally it holds said tail so that one of a train of gears, for instance one (the second) of the toothed wheels supported by said bracket and adapted to transmit forward motion is in mesh with the (fourth) toothed wheel upon the shaft but upon operation of the slidable plate the direction of the slot therein moves said tail to part-rotate the bracket and cause the said second and fourth gears to unmesh and upon further movement to mesh the other or third toothed wheel (adapted to transmit reverse motion) with said fourth toothed wheel on the intermediate shaft. The slidable plate is operated by a two part rod in guides on the back member of the sub-framing. One outer end of this rod is jointed to a lever arm and is adapted to operate it to move the slidable slot plate while the other outer end of said rod is connected to a radius arm near the end of the variable speed pulley operating spindle while the two inner ends have a locking and releasing device between them. The radius arm is directed so that while the pulley operating spindle and levers are in position in forward motion the two parts of said slidable rod are free of one another but when after the lowest speed has been attained and neutral position or reverse is desired the operating spindle is part revolved to free the second or third of the toothed wheels from the fourth toothed wheel before mentioned the adjacent ends of said two part rod connected together by peculiar locking devices so that the two part rod moves as one rod and operates the slidable plate to actuate the train of gears freeing the operating gears and then passing the motion reversely. The two part rod operates as one until the control lever is returned to neutral position when the parts are again separated the part connected to the slidable plate being retained in forward drive position the part of the two part rod connected to the slidable plate being locked in position in forward motion by a spring pin which passes through a guide and into an orifice in said part. An operating lever for this pin has a projection which is adapted to engage an inclined face or ramp on a projection on the other or second part of said two part rod to raise and release said pin as the inner ends of the two parts meet. And said second part also has on it a spring catch with a rounded projection adapted to take into an orifice in the first part when the ends abut after the spring pin is released and to withdraw when the spring pin again locks in the first part upon the return movement of the rod.

In another embodiment of my invention the rear or driven variable speed pulley has a hollow shaft surrounding the axle casing which casing has a differential casing or medial chamber. In this medial chamber is a hollow brake drum surrounding simple differential gearing between the ends of the half axles and having around it a brake band whose tightening or operating lever extrudes through a slot in the medial chamber of the axle casing. On the hollow driven pulley shaft is a driver toothed wheel in which one or the other of a pair of meshed toothed pinions are adapted to mesh and one of these toothed pinions is adapted to mesh with an intermediate toothed wheel in mesh with the teeth of an internally toothed external flange or rim of the brake drum. The spindle of the intermediate toothed wheel has bearings in the wall of the medial chamber of the axle casing and also forms a pivot for a bracket or plate carrying the axles of the toothed pinions of this gear. And this bracket or plate is part revoluble on its pivot and has a tail extension supported in and by its operating mechanism and this tail passes into a slidable plate supported on the back member of the chassis of the vehicle or on the back member of a sub-framing affixed to the axle casing or being hinged thereto or having bearing on said casing and supported by hounds or torsion rods from the fore part of the vehicle chassis and this slidable plate is of similar construction and has similar functions to that hereinbefore described.

The tension of the driving belt on the variable speed pulleys is adjusted to transmit power to a desired extent and the screw rod and gears and connected devices before described permit of adjustment as required for this purpose. When it is desired to overcome a temporary strain or overload the depression of the pedal of the toggle rod forces the bearing forwardly and further tensions the belt. And if the load exceeds the transmitting power of the belt the spring between the part revoluble bearing block and the slidable carrier will compress and relieve the strain and the belt will slip and the breaking of gears be thus avoided. This feature of my invention, however, forms the subject matter of a separate divisional application.

But in order that this invention may be easily carried into effect the best known practical application of the same will now be described with reference to the drawings accompanying and forming part of this complete specification.

Figures 2, 3:
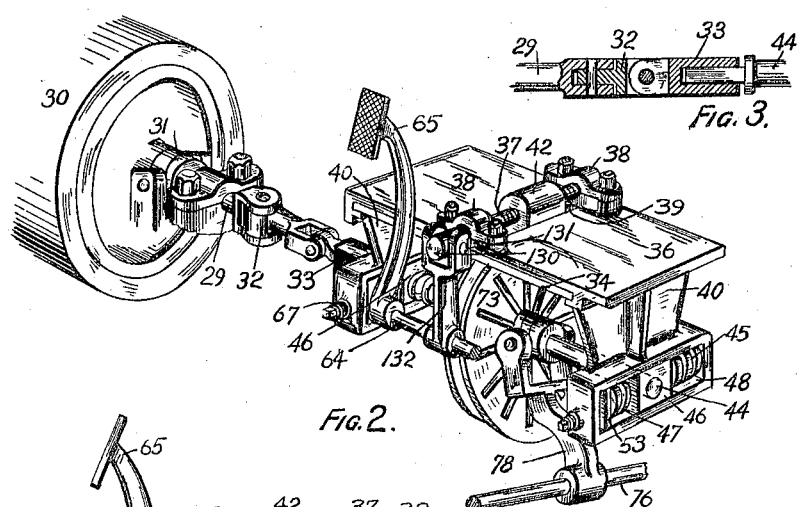
Figures 4, 5:
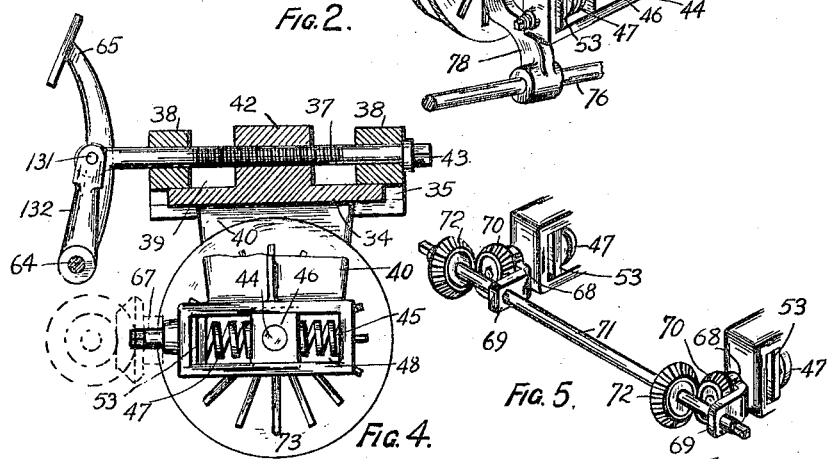
Figure 6:
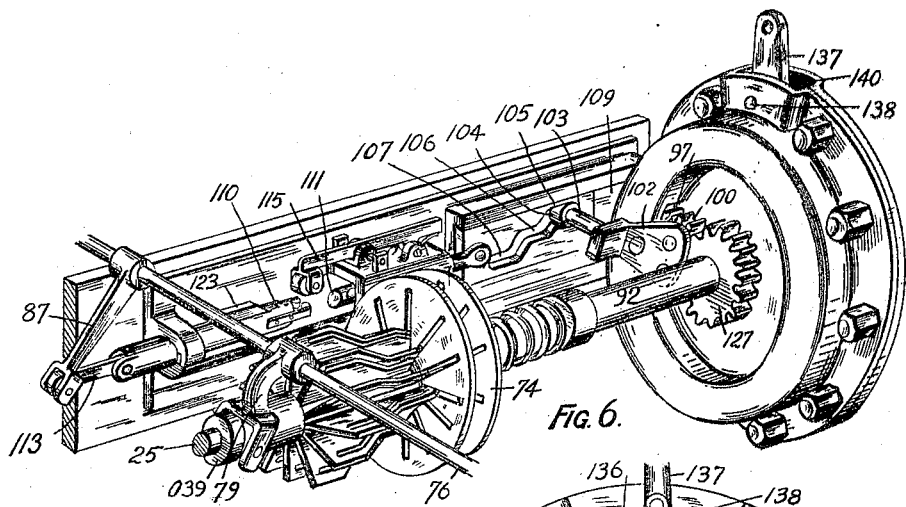
Figure 7:
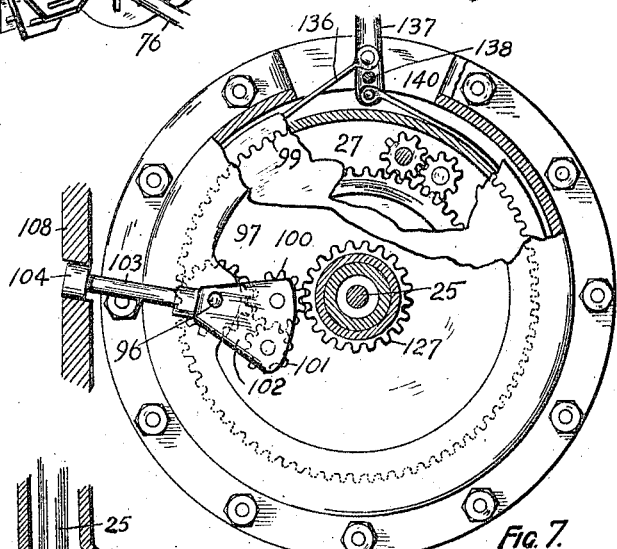
Figure 8:
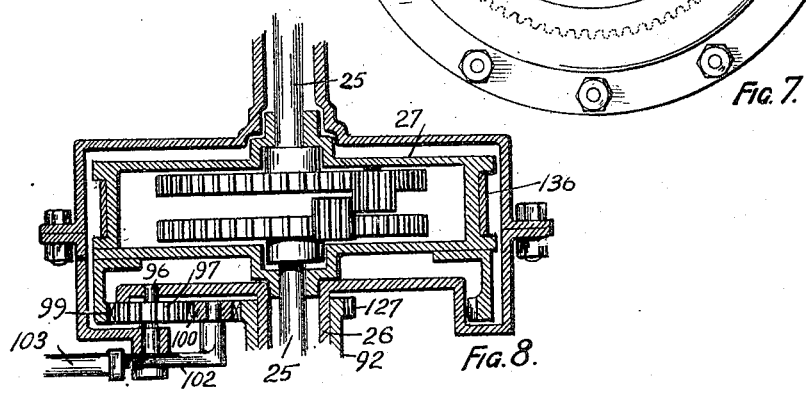
Figure 11:
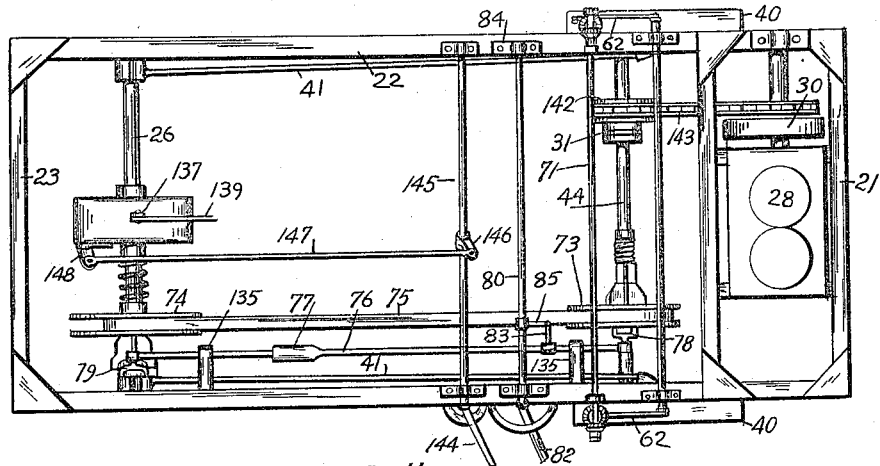
Figure 12:
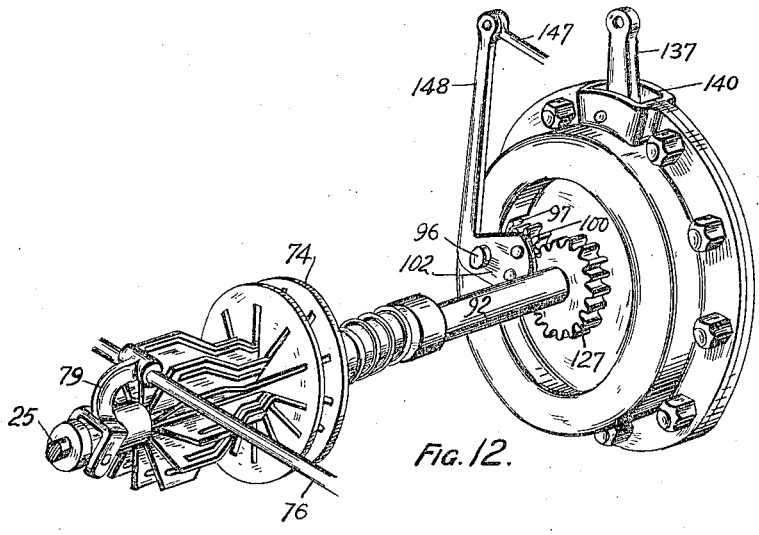
Figure 13:
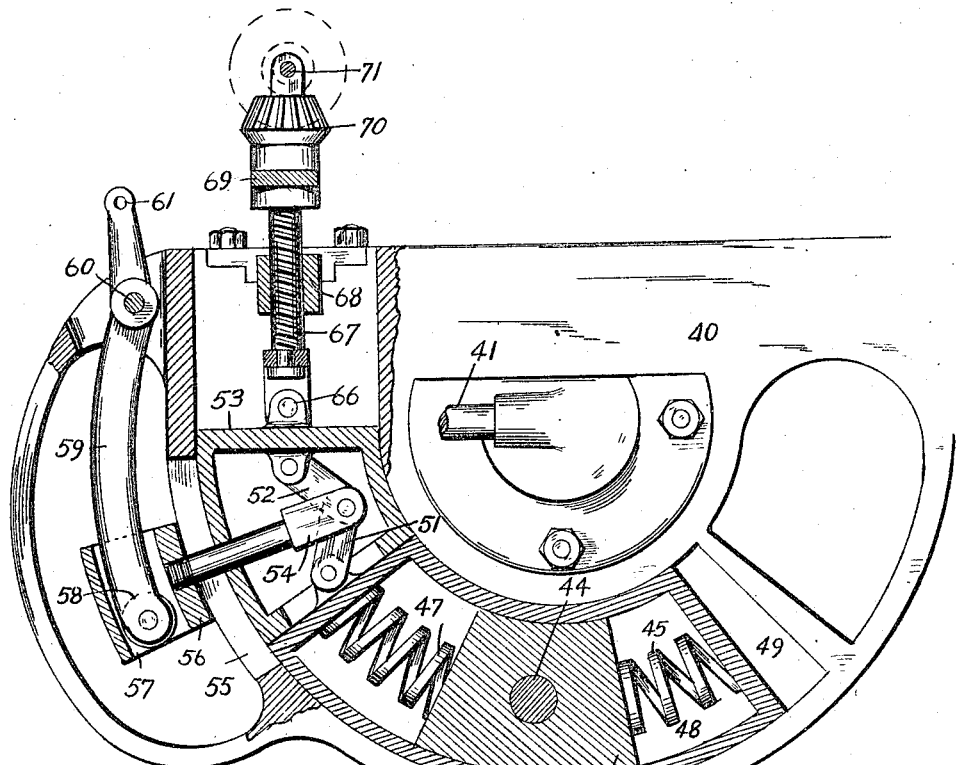
Figure 14:
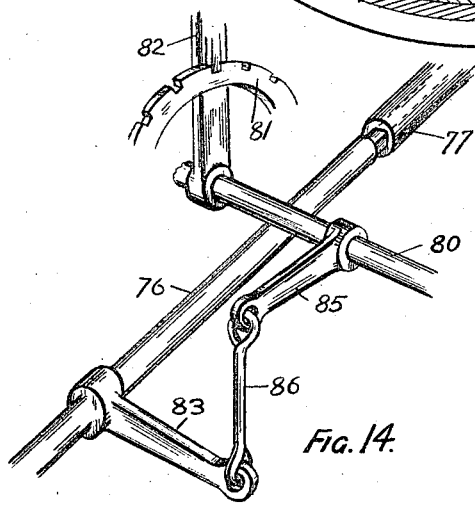

Figure 1 is a plan view showing the main parts of this invention as applied to an ordinary automobile chassis, Fig. 2 is an enlarged perspective view of the main parts of the forward portion of the transmission mechanism, Figs. 3 and 4 sectional elevations of parts of the same and Fig. 5 an enlarged perspective view of another part. Fig. 6 is an enlarged perspective view of the rear portion of the transmission mechanism. Figs. 7 and 8 are sectional elevations and sectional plans respectively of the differential gear and casing. Fig. 9 is a view similar to that of Fig. 1 showing this invention modified as more suitable for heavy vehicles and Fig. 10 shows on an enlarged scale the forward portion of the transmission mechanism thereof. Fig. 11 is a similar view to Figs. 1 and 8 showing further modifications and Fig. 12 is an enlarged view of the rear portion of the transmission mechanism of the latter modification. Fig. 13 is an enlarged sectional elevation of part of the transmission shown in Fig. 10 and Fig. 14 is a perspective view of part of the control. Figs. 15 and 16 are part sectional views of change gear device and Figs. 17, 18 and 19 are sectional details on lines 17, 18 and 19 respectively in Fig. 15 while Fig. 20 diagrammatically illustrates the changing gears.

The chassis to which these improvements are applied has front member 21 side members 22 and back member 23 and has front springs steering wheels and axle as well as back springs not shown and a back axle which latter is contained in casing 26 with an enlargement and a differential casing 27 medially thereof. And on this chassis is an ordinary internal combustion engine 28 having a crank shaft 29 a fly wheel 30 and a clutch 31. And all these before mentioned parts are of any ordinary and well known construction and in themselves form no part of this invention.

As shown in the drawings other than in Figs. 9 and 11 the crank shaft 29 is connected by a double knuckle joint 32 having a telescopic portion 33 to a drive shaft 44 of the variable speed pulley mechanism which is described and explained in the specification of before mentioned Letters Patent of the United States of America No. 1173787, dated 29th February 1916.

This drive shaft 44 has a bearing at each end in blocks 46 slidable in between springs 45 and 47 in guide slots 48 of bracket 40. The bracket 40 depends from slide frame or table 34 which slides in grooves 35 of frame 36 which is a cross member of the chassis. In this frame 36 is a slot 39 through which slot protrudes a lug 42 (having therethrough a female screw thread) from the table 34 and through this lug 42 is a male screw 37 in bearing 38 at each end of slot 39 and having at one end a squared head 43 for a spanner or key and having at the other end a revoluble collar 130 with trunnions 131 for a fork lever 132 from the shaft 64 of the foot pedal 65. The adjustment of block 46 in guide 48, is imparted to it by means of tension plate 53 on the end of screw rod 67 whose other end has a bevel gear wheel 70 in mesh with bevel gear wheel 72 on shaft 71 in bearings 69 in brackets 68 from brackets 40 and said shaft 71 has at each end a squared end on which may be placed a handle whereby it may be revolved so as to govern the position of the drive shaft 44 and consequently that of the driver 73 of the variable speed pulleys 73 and 74 with their connecting belt 75 which pulleys are constructed and operated as fully described in the before cited patent and require no further description herein except to say that each pulley has a plurality, shown as three sets of segments to give three variable sized diameters complementary to the three variable sized diameters of the other pulley and that the control or shifting gear for varying the relative sizes of the pulleys has a through spindle 76 in two parts with telescopic connections 77 and which spindle 76 is conveniently supported in bracket bearings or eyes from the chassis members or from the body of the vehicle as at 135. This spindle 76 has oppositely directed radial forks 78 and 79 extending therefrom to the slidable collars 038 and 039 of the respective variable speed pulleys so that a partial rotation of said spindle 76 will contract one and expand the other of said pulleys synchronously. This partial rotation is imparted to said spindle 76 as desired by means of the control lever 82 in quadrant 81 on the end of spindle 80 in bearings 84 and having radial arm 85 with link 86 to radial arm 83 of spindle 76 which spindle also has another radial arm 87 for operating the drive the idle and reverse gears hereinafter described.

The back axle casing 26 with a medial enlargement has a differential casing 27 internally thereof in which is an ordinary differential gear connecting the two half back axles 25 with affixed brake drum (not shown). Within the axle casing 26 and surrounding the differential casing 27 is a flexible brake band 136 jointed to lever 137 fulcrumed on pin 138 on said casing 26 through which is an orifice 140 to allow said lever to operate when actuated by rod 139 connecting to a conveniently positioned hand or pedal control (not shown). On the casing 26, at each side, the fore end of a side member 89 which, with a back member 90 make up a sub-framing, is supported and held rigidly in place. The drive or crown wheel 99 of the drive has reverse teeth integral with and internally of the differential gearing and it meshes with driven toothed wheel 97 mounted upon a stub spindle 96 on the axle casing 26. This wheel 97 is adapted to have geared therewith one of the forward and reverse toothed pinions 100 and 101 having bearing respectively on stub axles from an arm plate 102 and being in gear with one another and is further adapted to have disengagement from both said pinions. The arm plate 102 has bearing on pintle 96 and so with its toothed pinions 100 and 101 is part-revoluble around the tooth wheel 127 on shaft 92 of the driven variable speed pulley 74 which shaft surrounds the axle casing 26. This plate 102 has an arm or stem or tail 103 with a head 104 revoluble in a stepped slot 105, 106, 107 in a slidable slot plate 108 in a housing 109 affixed to the back member 90 of the rigid rear sub-framing. The slot plate 108 is connected by a two piece locking bolt 110, 111 in a housing 112 and a link 113 with the end radial arm 87 of the part revoluble spindle 76 of the control hand lever 82. The rear end 114 of the two piece bolt is directly connected by a joint to the slot plate 108 and carries a spring lock bar 115 with locking pin 116 extending through the housing 112 adapted to take in an orifice 118 in the bolt 110 and this lock bar 115 extends forwardly above the bolt 111 with a roller 119 contacting thereon. And the bolt 110 on its forward end has two recesses or slots 120 adapted to receive correspondingly shaped feathers or blocks 121 on the ends of rearwardly extending spring arms 122 from bolt 111 which latter has also a ramp 123 upon it in the path of the roller 119. The spring arms 122 are within a lifting frame suspended from the joint pin 124 of the lock bar 115 and the side members 125 of said lifting frame have contractions or ramps 126 on their inner faces adapted on rising to contact with the outer faces of spring arms 122 and force the prints or blocks 121 on their inner faces into the recesses or slots 120.

In operation a prime mover such as the engine being started imparts motion through the gearing described to shaft 44 and the driver variable pulley 73 thereon by belt 75 conveys it to corresponding variable pulley 74 on shaft 92 on axle casing 26 and consequently to the driver toothed wheel 127 which having the plate 102 and its pinions 100 and 101 being in neutral position as shown at "B" in Fig. 20 with the hand control lever 82 in its fourth position on its quadrant will only idle and no motion will be given the wheels 100 and 101 or to the differential gear and axle. To start the vehicle the first or slow motion is given to the differential gear and axle by moving lever 82 to third position on the quadrant and the gears position as shown at "A" in Fig. 20 with the pinion 100 in mesh with wheels 97 and 127 and pinion 101 idling and the diameter of the driven variable speed pulley 74 of its largest size. To increase speed the handle 82 is advanced to second position and again to first position without affecting the driving gear but altering the relative diameters of the variable speed pulleys 73 and 74. To reverse the direction of the vehicle the handle 82 is moved right back to its fifth position on its quadrant as shown at "C" in Fig. 20 when pinion 101 is in gear with wheel 127 and through pinion 100 conveys reverse motion to wheel 97. In the operations of reducing speed from top to intermediate and to first or slow only the fore part 111 of the two part bolt is moved and so the arm or tail 103 of the plate 102 is not moved. But when moving the handle 82 to neutral (or its fourth) position the lock bar 115 is lifted by ramp 123 passing under roller 119 freeing the pin 116 from its housing 118 at which time spring arms 122 contacting on inclines 126 are caused to close in and the blocks 121 to take into recesses or slots 120 and lock the part bolt 110 with the part bolt 111 so that said bolt 110 will move sliding plate 108 and cause end 104 of arm or tail 103 of casing 102 to move from step 105 to step 106 in slot plate 108 and so alter the meshing of the gears 97, 127, 100 and 101 as before mentioned. The last described movement takes place also in going into reverse and in addition the bolt 110 moves the plate 108 farther along and the tail head 104 is moved to step 107 with effect on the gearing as desired and as before described. On return from reverse to neutral and from neutral to first speed reverse motion of the part bolt 110 has the desired effect but as the neutral position is passed the pin 116 enters its housing 118 and the lifting frame lowers the ramps 126 of the side member of the frame allowing the ends 121 of the spring arms 122 to leave their recesses 120 and free the part bolt 110 of further positive connection with part bolt 111.

When it is desired to further tension the driving belt 75 it is only necessary to give a turn or so to each of the screws 67 by means of a handle or spanner on its end. And this slidable movement of the blocks 46 carrying the shaft 44 is utilized also for a momentary tightening of the belt 75 as might be required at a sharp pitch in the roadway in which case the pedal 65 would be depressed and the movement being transmitted by lever 132 to thrust collar 130 the slide table 34 would move forwardly and so force bearing blocks 46 forward in guides or slots 48 of brackets 40. The forward movement of shaft 44 being accommodated by the knuckle joint 32 and telescopic connection 33. Or this adjustment may be effected by means of a key or spanner on screw 71.

In the modified construction shown in Figs. 9 and 10 the crank shaft 29 (having a clutch 31) instead of connecting direct to the variable pulley shaft has a pulley 30 with a belt 141 to a pulley 142 on a second or lay shaft 44 having the variable speed pulley 73 thereon. The shaft 44 has a bearing at each end in block 46 part circularly slidable in sector guide 48 between springs 45 and 47 and which sector guide in itself also part-circularly slidable in sector housing 49 in brackets 40 (which brackets 40 are riveted to the side members of the chassis). The movement of block 46 in sector guide 48 is imparted to it by means of a toggle whose members 51 and 52 are carried by a slidable box 53 in sector housing 49 and these members are jointed respectively to the end of sector guide 48 and the end of box 53 while the third or operating member 54 of said toggle passes through the casing of said box 53 and through a slot 55 in the housing 49 and has on its end a lever block 56 having a path 57 for a roller 58 on the end of a lever 59 fulcrumed at 60 to the bracket 40 and jointed at 61 to a connecting rod 62 which in turn is jointed to a crank or arm 63 on shaft of pedal control lever 65. The upper end of box 53 is jointed at 66 to a screw rod 67 in nut 68 on bracket 40 and which rod 67 supports and passes through double ended bracket 69 and carries on its end a miter or bevel toothed wheel 70. The brackets 69 at each side provide bearing for a transverse shaft 71 carrying the complementary bevel or toothed wheel 72 and at each end having a squared end on which may be placed a key or spanner whereby said shaft 71 may be revolved and the position of the box 53 be adjusted so as to govern the positions of sector guide 48 and the shaft 44 and consequently that of the driver 73 of the variable speed pulleys 73 and 74 with their connecting belt 75. From each of the brackets 40 a hound or tension rod 41 extends to the brackets of the framing 90 secured to the axle casing 26 hereinbefore described.

When it is desired to further tension the driving belt 75 it is only necessary to give a turn or so to the shaft 71 by means of a handle or spanner on its end. This motion actuates screw rod 67 and moves box 53 and the sector guide containing the bearing blocks 46 of the driver variable speed pulley 73 rearwardly in the sector housing 49 as indicated by dotted lines. And this slidable movement of the sector guides and bearing blocks is utilized also for a momentary tightening of the belt 75 as might be required at a sharp pitch in the roadway in which case the pedal 65 would be depressed and the movement being transmitted by shaft 64 radius arms 63 and 61 lever rod 59 rod 54 opens the toggle members 51 and 53 and so forces sector guide 48 with bearing blocks 46 forward in sector housing 49. In all other respects the mechanisms are practically or substantially the same as those hereinbefore described and the functions of same are identical.

In the modified construction or application of this invention illustrated in Figs. 11 and 12 the drive from the engine shaft is by means of a chain belt 143 around sprockets to a second shaft 44 having bearings in blocks 46 and connections as described with reference to Figs. 9 and 10 but which is parted and connected by a clutch 31. This construction further dispenses with the two part bolt of Figs. 15 to 17 and its various connections hereinbefore described, also the arm head 104 in stepped slots of sliding plate 108 and the plate 102 with the toothed wheels 100 and 101 is operated by a hand lever 144 on the transverse spindle 145 having a crank 146 thereon which is connected by a rod 147 to the radial arm 148 of plate 102. The other parts are substantially the same or identical with those hereinbefore described.

What I claim as my invention, and desire to secure by Letters Patent is:—

1. A transmission mechanism for motor vehicles including a prime mover and a differential gear on the rear axle, said mechanism comprising a front variable diameter pulley operatively connected with the prime mover, a rear variable diameter pulley on the rear axle, a belt operatively connecting the two pulleys, means for simultaneously and oppositely adjusting the diameter of the two pulleys, and reversible connecting means between the rear pulley and the differential gear.

2. A transmission mechanism for motor vehicles including a prime mover and a differential gear, said mechanism comprising a variable diameter pulley operatively connected with the prime mover, a second variable diameter pulley arranged co-axially with the differential gear, a belt operatively connecting the two pulleys, a drive gear operated by the second pulley, shiftable connecting means between the drive gear and the differential gear arranged in one position to drive the differential gear in one direction and in another position to drive the differential gear in the reverse direction and in a third position to be inoperative, and manually operative means for shifting the connecting means.

3. A transmission mechanism for motor vehicles including a differential gear for the rear axle and a prime mover having a shaft, said mechanism comprising a pair of variable speed pulleys, means operatively connecting one of the pulleys to the prime mover shaft, a belt operatively connecting the two pulleys, shiftable connecting means between the second pulley and the differential gear arranged in one position to drive the differential gear in one direction and in another position to drive the differential gear in the reverse direction and in a third position to be inoperative, a manually controlled operating member arranged to simultaneously and oppositely adjust the diameter of the two pulleys, and means operatively connected with said member for shifting the connecting means.

4. A transmission mechanism for motor vehicles including a prime mover and differential gear on the rear axle, said mechanism comprising a front variable diameter pulley operatively connected with the prime mover, a rear variable diameter pulley on the rear axle, a belt operatively connecting the two pulleys, means for simultaneously and oppositely adjusting the diameter of the two pulleys, a drive gear operated by the second pulley, shiftable connecting means between the drive gear and the differential gear arranged in one position to drive the differential gear in one direction and in another position to drive the differential gear in the reverse direction and in a third position to be inoperative, and manually operative means for shifting the connecting means.

5. A transmission mechanism for motor vehicles including a prime mover and a differential gear for the rear axle, said mechanism comprising a variable speed device, shiftable connecting means between the said device and the differential gear arranged in one position to drive the differential gear in one direction and in another position to drive the differential gear in the reverse direction and in a third position to be inoperative, and manually operative means arranged in control of both the variable speed device and the shiftable connecting means.

6. A transmission mechanism for motor vehicles including a prime mover and a differential gear for the rear axle, said mechanism comprising a variable speed pulley, a drive gear operated thereby, shiftable connecting gearing between the drive gear and the differential gear adapted in its various positions to drive the differential gear in the forward and reverse directions and to be inoperative to communicate motion to the differential gear, and manually operative means arranged in control of both the variable speed pulley and the shiftable connecting gearing.

7. A transmission mechanism for motor vehicles including a prime mover and a differential gear for the rear axle, said mechanism comprising a variable speed pulley, a drive gear operated thereby, shiftable connecting gearing between the drive gear and the differential gear adapted in its various positions to drive the differential gear in the forward and reverse directions and to be inoperative to communicate motion to the differential gear, and manually operative means arranged in one portion of its movement to vary the diameter of the variable speed pulley and in another portion of its movement to shift the connecting gearing.

8. A transmission mechanism for motor vehicles including a prime mover and a differential gear for the rear axle, said mechanism comprising a variable speed pulley, a drive gear operated thereby, shiftable connecting gearing between the drive gear and the differential gear adapted in its various positions to drive the differential gear in the forward and reverse directions and to be inoperative to communicate motion to the differential gear, a manually controlled operating member for varying the diameter of the variable speed pulley, a two-part bolt one part of which is operatively connected to the shiftable connecting gearing and the other part of which is operatively connected to the operating member, and coupling means operative to couple the two parts of the two-part bolt when the operating member is in position of lowest speed.

9. A transmission mechanism for motor vehicles including a differential gear for the rear axle and a prime mover having a shaft, said mechanism comprising a pair of variable speed pulleys, means operatively connecting one of the pulleys to the prime mover shaft, a belt operatively connecting the two pulleys, a drive gear operated by the second pulley, shiftable connecting gearing between the driven gear and the differential gear adapted in its various positions to drive the differential gear in the forward and reverse directions and to be inoperative to communicate motion to the differential gear, a manually controlled operating member for simultaneously and oppositely adjusting the diameter of the two pulleys, a two-part bolt one part of which is operatively connected to the shiftable connecting gearing and the other part of which is operatively connected to the operating member, and coupling means operative to couple the two parts of the two-part bolt when the operating member is in position of lowest speed.

10. A transmission mechanism for motor vehicles including a differential gear for the rear axle and a prime mover having a shaft, said mechanism comprising a pair of variable speed pulleys, means operatively connecting one of the pulleys to the prime mover shaft, a belt operatively connecting the two pulleys, movable bearings for the said pulley, manually operative means to adjust the bearings and thereby vary the tension of the belt, a drive gear operated by the second pulley, shiftable connecting gearing between the driven gear and the differential gear adapted in its various positions to drive the differential gear in the forward and reverse directions and to be inoperative to communicate motion to the differential gear, a manually controlled operating member for simultaneously and oppositely adjusting the diameter of the two pulleys, a two-part bolt one part of which is operatively connected to the shiftable connecting gearing and the other part of which is operatively connected to the operating member, and coupling means operative to couple the two parts of the two-part bolt when the operating member is in position of lowest speed.

In testimony whereof I have signed my name to this specification in the presence of two subscribing witnesses.

WILLIAM BUYERS DUNBAR.

Witnesses:
 PERCY NEWELL,
 I. EASTON.

Copies of this patent may be obtained for five cents each, by addressing the "Commissioner of Patents, Washington, D. C."